US009089808B2

(12) United States Patent
Stahl et al.

(10) Patent No.: US 9,089,808 B2
(45) Date of Patent: Jul. 28, 2015

(54) METHOD AND DEVICE FOR GAS PURIFICATION BY MEANS OF PARTIAL CONDENSATION, AND METHOD FOR OPERATING THE DEVICE

(75) Inventors: Manfred Stahl, Krefeld (DE); Thomas Kutz, Brüggen-Born (DE)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 1489 days.

(21) Appl. No.: 12/514,231

(22) PCT Filed: Oct. 29, 2007

(86) PCT No.: PCT/EP2007/061635

§ 371 (c)(1),
(2), (4) Date: Nov. 1, 2010

(87) PCT Pub. No.: WO2008/055804

PCT Pub. Date: May 15, 2008

(65) Prior Publication Data

US 2011/0030421 A1 Feb. 10, 2011

(30) Foreign Application Priority Data

Nov. 10, 2006 (DE) ........................ 10 2006 053 132
Feb. 9, 2007 (DE) ........................ 10 2007 007 204

(51) Int. Cl.
*F25D 17/06* (2006.01)
*F25D 17/02* (2006.01)
(Continued)

(52) U.S. Cl.
CPC ............ *B01D 53/002* (2013.01); *B01D 5/0015* (2013.01); *B01D 7/02* (2013.01); *F28D 7/0066* (2013.01); *F28D 7/1607* (2013.01)

(58) Field of Classification Search
CPC ...... B01D 5/0015; B01D 7/02; B01D 53/002; F28D 7/0066; F28D 7/1607
USPC ............. 62/532, 123, 600, 601, 606, 614, 96, 62/118, 98, 430
See application file for complete search history.

(56) References Cited

U.S. PATENT DOCUMENTS 3,606,761 A 9/1971 Muenger et al.
3,670,522 A * 6/1972 Bresin ............................. 62/333
(Continued)

FOREIGN PATENT DOCUMENTS

DE 102004026909 12/2005
DE 102004062776 6/2006
(Continued)

OTHER PUBLICATIONS

PCT/EP2007/061635 Written Opinion dated Mar. 6, 2008.
(Continued)

*Primary Examiner* — Cassey D Bauer
*Assistant Examiner* — Joseph Trpisovsky
(74) *Attorney, Agent, or Firm* — Christopher J. Cronin

(57) ABSTRACT

The subject matter of the invention is a method for purifying a foreign-substance-laden gas flow of the foreign substance, with the gas flow being conducted through a heat exchanger and being placed in thermal contact with a cooling medium in order to freeze and/or condense the foreign substance out, wherein the purification takes place in only one tube heat exchanger, through the interior space of which the gas flow is conducted from a first end region to a second end region, and here, is cooled by means of contact with a first group of tubes which are traversed by the coolant, and in that the gas flow, in the second end region, is directly deflected again and is conducted back through the interior space of the heat exchanger to the first end region through a second group of tubes while undergoing an exchange of heat with the gas flow flowing into the interior space. A corresponding device has a heat exchanger having at least two groups of tubes which run through an interior space of the heat exchanger from a first end region to a second end region of the heat exchanger, with it being possible for the gas flow to traverse the interior space of the heat exchanger from a gas flow inlet at the first end region to the second end region, and with a first group of the tubes being part of a substantially closed cooling medium circuit, and a second group of the tubes for recirculating the gas flow from the second end region of the heat exchanger being connected to a purified gas outlet in the first end region. In order to further reduce the operating temperature in the second end region, it is possible for additional cooling medium to be injected into the cooling medium circuit upstream of said second end region. It is even possible for the injection to take place by means of an injector, which then replaces a pump and cooler.

29 Claims, 3 Drawing Sheets

(51) Int. Cl.

| | |
|---|---|
| ***F25D 11/00*** | (2006.01) |
| ***F25J 1/00*** | (2006.01) |
| ***F28D 7/10*** | (2006.01) |
| ***F28F 13/06*** | (2006.01) |
| ***B01D 53/00*** | (2006.01) |
| ***B01D 5/00*** | (2006.01) |
| ***B01D 7/02*** | (2006.01) |
| ***F28D 7/00*** | (2006.01) |
| *F28D 7/16* | (2006.01) |

(56) References Cited

U.S. PATENT DOCUMENTS

| | | | | |
|---|---|---|---|---|
| 4,181,508 | A * | 1/1980 | Schmid et al. | 95/290 |
| 4,639,262 | A * | 1/1987 | Heichberger | 62/606 |
| 5,814,231 | A * | 9/1998 | Borho et al. | 210/737 |
| 6,276,442 | B1 * | 8/2001 | Rasmussen | 165/110 |
| 2005/0109495 | A1 | 5/2005 | Cheng et al. | |

FOREIGN PATENT DOCUMENTS

| | | | | |
|---|---|---|---|---|
| EP | 0839560 | | 5/1998 | |
| EP | 1 045 215 | | 10/2000 | |
| EP | 1 602 401 | | 12/2005 | |
| EP | 1 674 140 | | 6/2006 | |
| WO | WO 0114807 | * | 3/2001 | F25B 25/00 |

OTHER PUBLICATIONS

International Search Report for PCT/EP2007/061635.
Search Report for DE 10 2006 053 132.9.

* cited by examiner 1
2
3
4
5
6
7
9
10
14
15
16
17
18
19
20
21
23
24
25
26
27
28
29
30
31
32
33
34
35
36
37
38
39
40
41

1
2
3
4
5
7
8
9
10
11
12
13
14
15
16
17
18
19
22
35

METHOD AND DEVICE FOR GAS PURIFICATION BY MEANS OF PARTIAL CONDENSATION, AND METHOD FOR OPERATING THE DEVICE

CROSS-REFERENCE TO RELATED APPLICATIONS

This application is a §371 of International PCT Application PCT/EP2007/061635, filed Oct. 29, 2007.

BACKGROUND

The invention relates to a method for purifying a gas flow, in which method a foreign-substance-laden gas is, for the purpose of condensing and/or freezing the foreign substance out, placed in thermal contact with a cooling medium, and to a corresponding device for gas purification, and to a method for operating the device.

Methods of said type are known in various variations, for example from EP 0839 560 to A1, EP 1 674 140 A1 or EP 1 602 401 A1. According to said prior art, for sufficient purification of the gas flow, an extremely high level of technical expenditure is required, often with several heat exchangers and complex regulating technology.

SUMMARY OF THE INVENTION

It is an object of the present invention to create a simple, cost-effective method for gas purification with the least possible technical and regulation-related expenditure, and an associated device and the regulation thereof.

A method according to claim 1, a device according to claim 13 and a method for regulating the device according to claim 24 serve to achieve said object. Advantageous embodiments which can be used individually or in combination with one another are specified in the in each case dependent claims.

The method according to the invention for purifying a foreign-substance-laden gas of the foreign substance manages with a single heat exchanger, through the interior space of which the gas flow is conducted firstly from a first end region to a second end region. Here, the gas flow is placed in thermal contact with tubes which run in the interior space. A cooling medium flows through a first group of said tubes, which cooling medium cools the gas flow, on its path in the interior space, to below the dew point of the foreign substance which is to be eliminated, so that the said foreign substance is condensed or frozen out. In the region of the second end region, the gas flow is so cold that it can, after exiting the heat exchanger, be deflected and conducted through a second group of tubes back through the interior space of the heat exchanger, as a result of which the gas flow in the interior space of the heat exchanger is cooled and the gas flow in the tubes is warmed up again. As it exits the heat exchanger in the first end region, the purified gas flow is then only slightly colder than the entering gas flow which is yet to be purified, referred to below as the untreated gas flow.

It is particularly advantageous if the cooling medium, which provides the required cooling power in the heat exchanger, is guided substantially in a closed circuit, with said cooling medium being cooled to a predefinable temperature by a primary coolant before entering the first end region of the heat exchanger.

The closed cooling medium circuit can be considered a secondary cooling circuit which, in a cooler, is brought to a desired temperature by means of a primary coolant, in particular to a temperature below the dew point of the foreign substance which is to be eliminated. A supercooled, liquefied gas, in particular liquid nitrogen or liquid carbon dioxide, is used in particular as primary coolant. The primary coolant can be guided in an open or closed circuit. In the case in particular of liquid nitrogen, an open circuit is preferably used, in which the liquid nitrogen is guided from a storage tank through the cooler, and the warmed-up nitrogen is discharged in gaseous form into the surrounding atmosphere or is injected for further use into an inert gas network.

The cooling medium in the first group of tubes and the already-cooled gas flow which is recirculated in the second group of tubes cool the gas flow in the interior space of the heat exchanger in principle in counterflow, with it however being preferably possible for guide plates to be arranged in the interior, which guide plates conduct the gas flow in a meandering fashion through the interior space, so that a combination of counterflow heat exchanger and crossflow heat exchanger can be provided. Said type of flow guidance results in a good exchange of heat of the gas flow with the cooling medium and the recirculated gas flow, regardless of how the first and second groups of tubes are distributed spatially. It is therefore possible to select the structurally most favourable distributions of said groups.

In the previously described method variants, it can be difficult to reduce the temperature level in the second end region of the heat exchanger far enough to also condense very low-boiling foreign substances there. For such applications, it is advantageous to supply an additional quantity of cooling medium, in particular liquid cooling medium, for example nitrogen or carbon dioxide, to said region. This takes place most favourably by injecting into the cooling medium supply line at the second end region. The additional cooling medium can be discharged again downstream of the first end region of the heat exchanger. Even if the cooling medium is guided in a substantially closed circuit, such an inlet and outlet of an additional quantity of cooling medium per unit time is highly advantageous. The additional quantity of cooling medium lowers the operating temperature in the second end region of the heat exchanger in the second end region of the heat exchanger, and thereby also permits the condensation of low-boiling foreign substances which would not otherwise be separated. For final residues of foreign substances which still remain, an active charcoal filter can, as is generally possible, be provided in the purified gas outlet.

A system according to the invention becomes particularly cost-effective and simple if an injector is provided instead of a pump and a cooler, by means of which injector primary coolant is injected into the cooling medium circuit. In this way, the temperature can be reduced to a desired level, with the circuit at the same time being kept in operation.

The additional cooling medium makes up preferably between 20 and 80%, particularly preferably approximately 40 to 60%, of the total cooling medium which traverses the heat exchanger per unit time. If all the cooling media in the system are identical, the supply is particularly simple, and the additional quantity of cooling medium has no negative influence on a cooling medium circuit.

A device according to the invention for purifying a foreign-substance-laden gas flow of the foreign substance, with the gas flow being conducted through a heat exchanger and being placed in thermal contact with a cooling medium in order to freeze and/or condense the foreign substance out, is characterized in that a tube heat exchanger is provided as a heat exchanger, having at least two groups of tubes which run through an interior space of the heat exchanger from a first end region to a second end region of the heat exchanger. Here, it is possible for the gas flow to traverse the interior space of the heat exchanger from a gas flow inlet at the first end region to the second end region. A first group of the tubes is part of a substantially closed cooling medium circuit, and a second group of the tubes serves for recirculating the gas flow from the second end region of the heat exchanger being connected to a purified gas outlet in the first end region.

The device according to the invention can be realized with only slightly modified, commercially available heat exchangers for two different cooling media, by virtue of the cooled purified gas which exits the interior space in the second end region being deflected and supplied again to a group of tubes.

It is however also possible in one particular embodiment to design the second end region of the heat exchanger as an internal deflection for the gas flow into the second group of tubes. For this purpose, it is possible either for openings to be provided between the tubes of the second group in a tube plate which holds the tubes there, or for lateral slots or openings to be provided in the second end region of the heat exchanger in the tubes of the second group, through which the gas flow can be directly deflected again and recirculated.

The first group of tubes is part of a closed cooling medium circuit in which a cooling medium is circulated. This can take place by means of a suitable delivery device, in particular a pump or a fan or a compressor. According to one preferred embodiment of the invention, the cooling medium circuit has a cooler which can be traversed by a primary coolant and which is arranged upstream of the first end region of the heat exchanger. In said cooler, the cooling medium is cooled to the temperature required for the purification of the gas flow, in particular to a temperature below the dew point of the foreign substance which is to be removed from the untreated gas flow.

The cooler is preferably connected to an open or closed primary coolant circuit, in particular to a supply with liquid nitrogen or liquid carbon dioxide.

In order to reduce the operating temperature in the second end region of the heat exchanger, it is advantageous if an additive inlet for an additional quantity of cooling medium per unit time is provided in the supply line for cooling medium to said region. In the case of a substantially closed cooling medium circuit, it is then of course also necessary to provide an additive outlet for the outlet of the additional quantity of cooling medium if the cooling medium circuit is to have an approximately constant pressure. Said additive outlet can be arranged anywhere downstream of the heat exchanger as viewed in the flow direction, preferably upstream of a delivery device.

It is also possible in one preferred embodiment for the total required cooling power to be imparted by injecting primary cooling medium into the circuit. For this purpose, an injector is provided, with it being possible for the kinetic energy during injection to be utilized for operating the circuit, so that in an embodiment of said type, the pump and cooler can be dispensed with. In this way, the system is very simple and easy to regulate.

In order to adjust or regulate the additional quantity of cooling medium per unit time, actuating devices are provided according to the invention, by means of which the proportion of additional cooling medium and therefore the operating temperature in the second end region of the heat exchanger can be determined.

It has been proven that it is advantageous over vertical arrangements known in the prior art to arrange the heat exchanger approximately horizontally, but with a slight gradient in the direction of the throughflow with cooling medium. Said gradient is less than 10% with respect to the horizontal; an inclination with respect to the horizontal of between 1° and 5° is preferably selected. This means that the condensed foreign substance runs on the underside of the interior space of the heat exchanger in the direction of the warmer end region, as a result of which it can be prevented that condensed foreign substance freezes solid and blocks a flow path.

In order to eliminate the condensate, the heat exchanger is provided on its underside with at least one condensate outflow, in particular even with two condensate outflows which are arranged at intervals in series in the direction of the throughflow with cooling medium. From said condensate outflows, the condensed foreign substance is conducted via condensate lines to a condensate collecting tank.

In one preferred embodiment, the heat exchanger has at least one first measuring sensor for measuring a measurement value from which the temperature of the gas flow in the second end region of the heat exchanger can be derived. A measurement value of said type is necessary in order to be able to operate the device such that the temperature required for eliminating the foreign substance always remains undershot.

In a further preferred embodiment of the invention, the device has at least one actuating element in the cooling medium circuit and/or one in the coolant circuit, which actuating elements are connected to a process regulator, so that the refrigerating power supplied to the heat exchanger can be regulated.

The device according to the invention has the particular advantage that it can be regulated very simply and reliably. If it is assumed that the gas flow which is to be purified can fluctuate in temperature and throughflow quantity, then it must be ensured under all operating conditions that the gas flow in the heat exchanger is cooled to a sufficient degree in order to condense or freeze a contained foreign substance out. For this purpose, a measurement value which is proportional to the temperature of the gas flow in the second end region of the heat exchanger is measured and adjusted in a regulated fashion to a predefined nominal value. Fundamentally two influenceable parameters in the cooling medium circuit are considered for regulation, specifically the throughflow of cooling medium and the temperature of the cooling medium. While it is possible to set the throughflow of cooling medium by means of the delivery device in the cooling medium circuit, the temperature can be set by means of the quantity of supplied primary coolant in the cooler. According to the invention, preferably both parameters are incorporated for regulating the system. A simple regulating structure results for example from the use of two regulating circuits. The temperature in the cooling medium circuit upstream of the heat exchanger (flow temperature) is set by regulating the throughflow of coolant in the cooler by means of the regulating valve, and the temperature in the cooling medium circuit downstream of the heat exchanger (return temperature) is set by regulating the throughflow of coolant by means of the delivery device.

When using only one injector for supplying refrigerating power and for operating the cooling medium circuit, the regulation is yet more simple. Only the quantity of the supplied cooling medium and the kinetic energy at the injection need be suitably regulated in order to keep the temperature at the ends of the heat exchanger at the desired nominal values.

Exemplary embodiments of the invention and their mode of operation are explained in more detail below on the basis of the drawing. The invention is however not restricted to the described exemplary embodiments, but rather modifications to the design of the heat exchanger, to the regulation and to the tube arrangement are also possible.

DETAILED DESCRIPTION OF THE INVENTION

Figure 1:
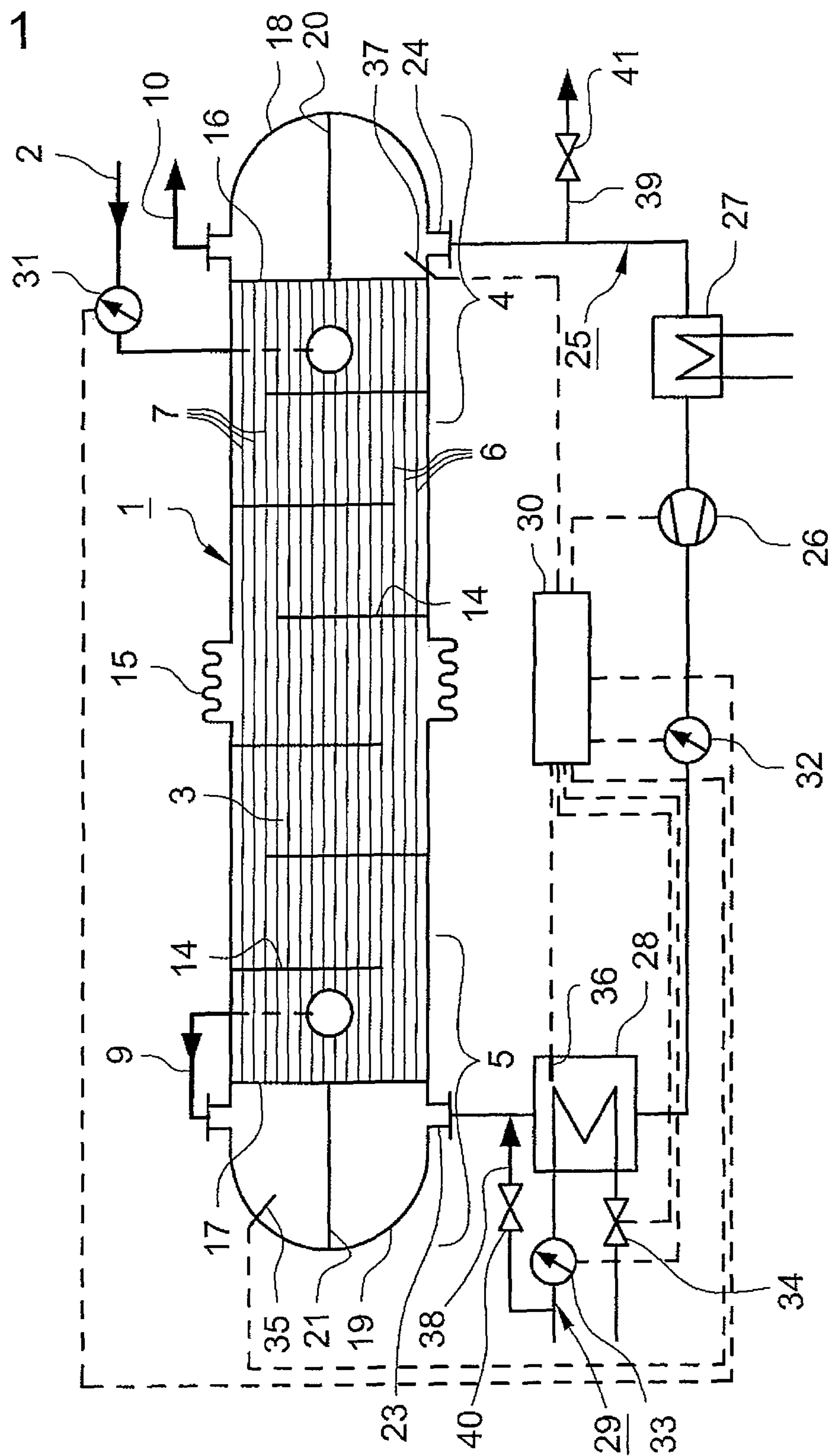
FIG. 1 schematically shows an exemplary embodiment of a device according to the invention with a horizontal longitudinal section through an associated heat exchanger, FIG. 2 schematically shows a vertical longitudinal section through the heat exchanger from FIG. 1, and FIG. 3 schematically shows a further exemplary embodiment of the invention.
Figure 2:
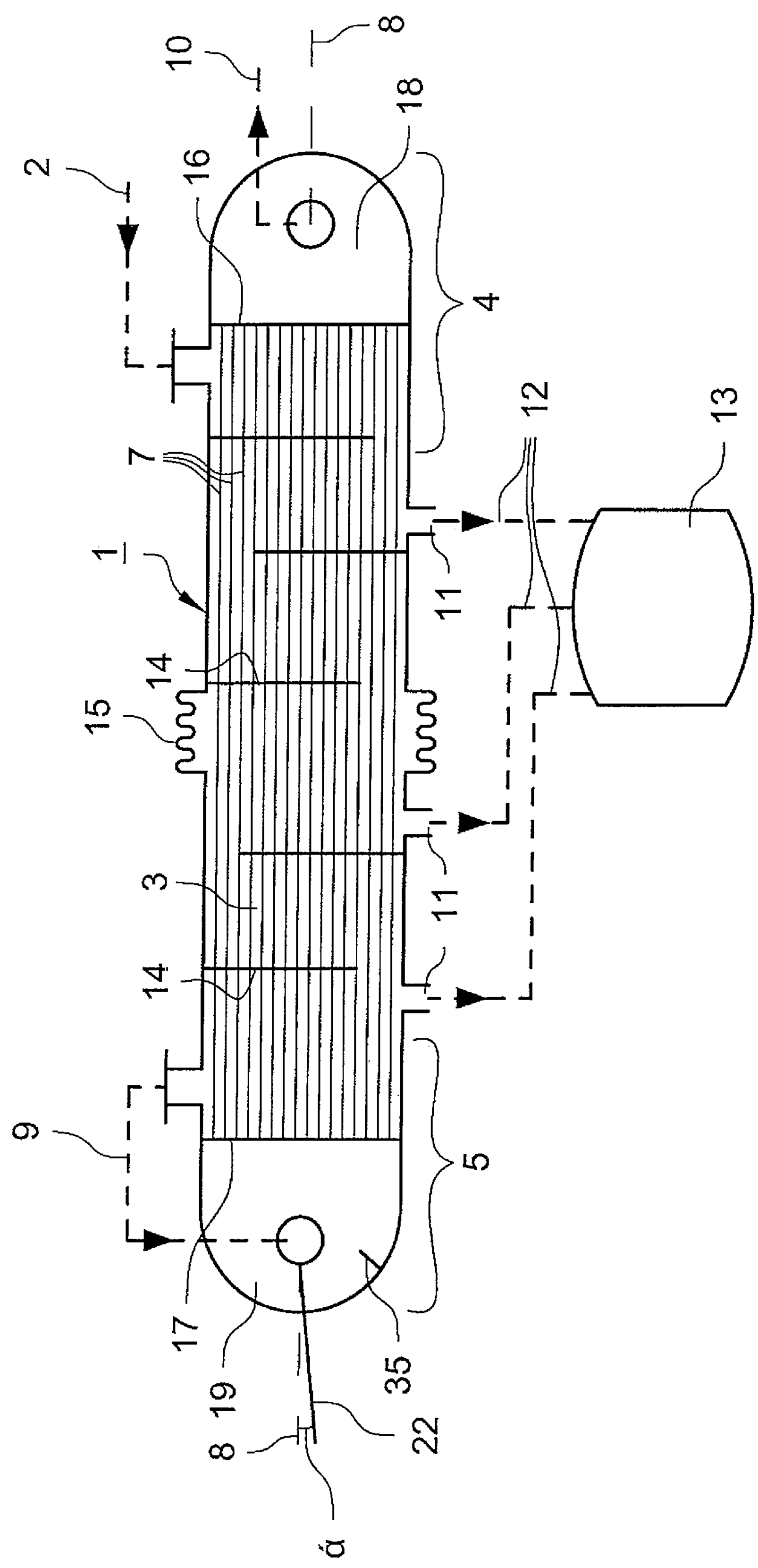

For a further understanding of the nature and objects for the present invention, reference should be made to the detailed description, taken in conjunction with the accompanying drawing, in which like elements are given the same or analogous reference numbers and wherein:

As shown in FIGS. 1 and 2, a foreign-substance-laden untreated gas flows through a gas flow inlet 2 into the interior space 3 of a heat exchanger 1. The interior space 3 of the heat exchanger 1 extends from a first end region 4 to a second end region 5. In the interior space 3, the gas flow is cooled, specifically to such an extent that the foreign substance contained therein falls below its dew point and is condensed or frozen out. The cooling of the gas flow in the interior space 3 takes place by means of thermal contact with a first group 6 of tubes and a second group 7 of tubes. Guide plates 14 which are arranged approximately transversely with respect to the throughflow direction serve to increase the thermal contact with the tubes, which guide plates 14 conduct the gas flow on a meandering path through the interior space 3. The first group 6 of tubes is part of a cooling medium circuit 25, the second group 7 of tubes serves to recirculate the cooled gas flow from the second end region 5 of the heat exchanger 1 to the first end region 4, with the already-purified gas being warmed up again approximately to the temperature of the untreated gas at the gas flow inlet 2, and contributing here to the cooling of the gas flow in the interior space 3. All the tubes are fastened, in the first end region 4 of the heat exchanger 1, in a first tube plate 16, and in the second end region 5, in a second tube plate 17. The heat exchanger 1 has a first dome 18 in the first end region and a second dome 19 in the second end region 5. The first dome 18 is divided by a first partition 20 into two parts, as is the second dome 19, by a second partition 21. In this way, the inlet and outlet openings of the first group 6 of tubes and of the second group 7 of tubes are separated, and can therefore be traversed separately by different media. For example, the first group 6 of tubes can be approached by a flow of cooling medium through a cooling medium inlet 23, which cooling medium leaves the heat exchanger 1 again through a cooling medium outlet 24. The second group 7 of tubes is approached by the already-purified gas flow in the second end region 5 of the heat exchanger 1, by virtue of said purified gas flow being guided by means of a deflection 9 from the interior space 3 of the heat exchanger to that part of the second dome 19 in which the second group 7 of tubes ends. The purified gas passes through the second group 7 of tubes to the first dome 18 and is discharged there through a purified gas outlet 10. The foreign substance which is to be removed condenses on the tubes in the interior space 3 of the heat exchanger 1 and drops downward. Any drops which run along the tubes are stopped at the latest at the guide plates 14. In the lower region of the heat exchanger 1, the condensate collects and passes through condensate outflows 11 via condensate lines 12 to a condensate collecting tank 13. An additive inlet 38 into the cooling medium inlet 23 serves to reduce the operating temperature in the second end region 5 below the temperature level which can be obtained with the previously described system. It is possible there for an additional quantity of in particular liquid cooling medium to be fed in per unit time, as a result of which the temperature in said region can be reduced. The additionally fed-in cooling medium evaporates on its path through the heat exchanger 1 and can be discharged again downstream of the first end region 4 via an additive outlet 39. An adjusting device 40 for the additive inlet 38 and an adjusting device 41 for the additive outlet 39 permit precise metering of liquid cooling medium in order to obtain the desired lowest operating temperature without the pressure in the cooling medium circuit 25 being adversely affected. By means of a slight inclined position by an angle $\alpha$ of approximately 1° to 5° of the longitudinal axis 22 of the heat exchanger 1 with respect to the horizontal 8, it is obtained that the condensate always flows in the direction of relatively warm surroundings, and therefore does not freeze solid before reaching a condensate outflow 11.

As illustrated in FIG. 1, the cooling medium circuit 25 contains a regulable delivery device 26 and a cooler 28 in which the cooling medium is cooled to a temperature below the dew point of the foreign substance which is to be removed. The cooler 28 is part of a coolant circuit 29, in particular an open circuit with liquefied nitrogen or carbon dioxide. The refrigerating power supplied to the cooler 28, and therefore the temperature (flow temperature) of the cooling medium exiting the cooler 28, are regulated by means of a regulating valve 34 for the coolant.

Such purification devices are often operated at intervals or alternately with a second device, with it then being possible during operating interruptions for the system to be defrosted, that is to say freed from ice. A heater 27 serves to assist the defrosting. It is possible for yet further components (not illustrated) to be provided, for example a dehumidifier for the untreated gas, if said untreated gas can contain water vapour.

The device is to be regulated with little expenditure. FIG. 1 also schematically illustrates typical elements of a process regulator 30. In the present exemplary embodiment, more measuring units are illustrated than are strictly necessary. In principle, it is sufficient to always keep the temperature of the purified gas flow in the second end region 5 of the heat exchanger 1 sufficiently low. For this purpose, the temperature there is preferably measured by means of a first temperature sensor 35 and passed to the process regulator 30. To influence said temperature, the throughflow of coolant through the cooler 28 and/or of cooling medium in the cooling medium circuit 25 can be varied. It is advantageous, but not necessary for simple regulation, to provide a throughflow measuring apparatus 31 for the untreated gas flow, a throughflow measuring apparatus 32 for the cooling medium and a throughflow measuring apparatus 33 for the coolant in the cooling circuit 29, and to pass their measurement values to the process regulator. The regulable delivery device 26 for regulating the cooling medium throughflow and a regulating valve 34 for regulating the coolant throughflow can preferably serve as actuating elements in the system. Further temperature sensors, for example a second temperature sensor 36 in the cooler 28 or a third temperature sensor 37 in the vicinity of the cooling medium outlet 24, can increase the operational reliability and regulating accuracy. The temperature of the cooling medium upstream of the heat exchanger 1 (flow temperature) is preferably measured by the first 35 or second 36 temperature sensor, and adjusted in a regulated fashion to a nominal value by adjusting the regulating valve 34. At the same time, the temperature of the cooling medium downstream of the heat exchanger 1 (return temperature) is measured by the third temperature sensor 37 and adjusted in a regulated fashion to a nominal value by adjusting the power of the delivery device. Both regulating actions together lead to favourable and economic operation of the device. Said device is correspondingly simple to regulate, cost-effective to produce and can be operated with a high level of effectiveness.

Figure 3:
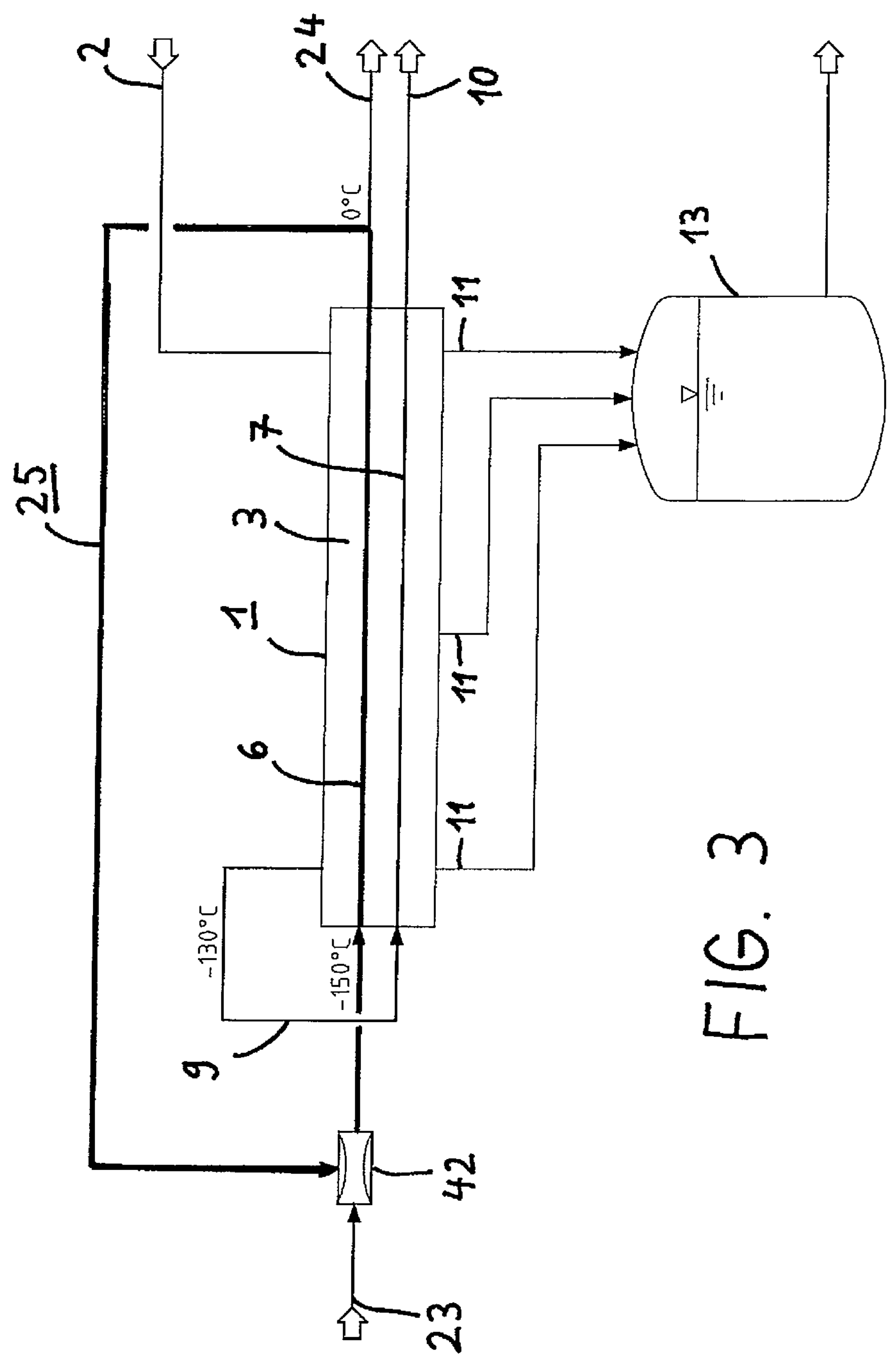

A system of yet more simple construction than the exemplary embodiment of the invention is schematically illustrated in FIG. 3. Identical parts are provided with the same reference symbols as in FIGS. 1 and 2. Said system differs from the previously described exemplary embodiments in particular in that no cooler is provided in the cooling medium circuit 25, but rather in that the required cooling power is introduced entirely by injecting cooling medium into the cooling medium circuit 25 by means of an injector 42. The cooling medium in said exemplary embodiment is typically nitrogen. By utilizing kinetic energy when injecting coolant, it is even possible to dispense with a pump in the cooling medium circuit 25. The cooling medium is kept moving by means of the injector 42. Liquid nitrogen can thus be supplied to the injector 42 through a cooling medium inlet 23. Liquid nitrogen is conventionally provided in a storage tank. The liquid nitrogen can be injected under pressure and/or as a two-phase flow, as a result of which it keeps the cooling medium circuit 25 in operation and at the same time cools the cooling medium. Typical temperatures in operation are specified in FIG. 3 by way of example at different points of the system. The predominant part of the cooling medium is guided in circulation; only the quantity supplied in the injector 42 is discharged again at the cooling medium outlet 24, in particular discharged into the atmosphere or into an inert gas network. A combination of closed and open circuit is therefore provided. As a result, the system is particularly simple and cost-effective. The regulation is also simpler than as described above. It is basically possible for only the quantity and/or kinetic energy of the cooling medium supplied in the injector 42 to be varied, which is however also sufficient in order to thereby adjust the temperatures at the end regions of the heat exchanger 1 to the desired values in a regulated fashion. In order to regulate the kinetic energy of the supplied cooling medium, it is possible for an adjustable injector 42 with variable nozzle cross section and/or variable nozzle direction to be used. Said injector 42 then acts as a jet pump. The adjustment possibilities known from jet pumps can then also be applied here. Alternatively or additionally, the quantity of the cooling medium supplied to the injector 42 and/or the quantity of the recirculated gas flow can be regulated in particular using appropriate control valves. In particular the temperature of the cooling medium behind the injector 42 and/or the temperature of the gas flow leaving the heat exchanger 1 can be used as control variables.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

List of Reference Symbols

1 (Tube) heat exchanger
2 Gas flow inlet (untreated gas)
3 Interior space of the heat exchanger
4 First end region of the heat exchanger
5 Second end region of the heat exchanger
6 First group of tubes
7 Second group of tubes
8 Horizontal
9 Deflection
10 Purified gas outlet
11 Condensate outflow
12 Condensate line
13 Condensate collecting tank
14 Conducting plates
15 Compensator
16 First tube plate
17 Second tube plate
18 First dome
19 Second dome
20 First partition
21 Second partition
22 Longitudinal axis
23 Cooling medium inlet
24 Cooling medium outlet
25 Cooling medium circuit
26 Delivery device
27 Heater
28 Cooler
29 Coolant circuit
30 Process regulator
31 Throughflow measuring apparatus for gas flow
32 Throughflow measuring apparatus for cooling medium
33 Throughflow measuring apparatus for coolant
34 Regulating valve for coolant
35 First temperature sensor
36 Second temperature sensor
37 Third temperature sensor
38 Additive inlet
39 Additive outlet
40 Adjusting device for the additive inlet
41 Adjusting device for the additive outlet
42 Injector
$\alpha$ Angle of the longitudinal axis 22 with respect to the horizontal 8

What is claimed is:

1. Method for purifying a foreign-substance-laden gas flow of the foreign substance, with the gas flow being conducted through a shell and tube heat exchanger and being placed in thermal contact with a cooling medium in order to freeze and/or condense the foreign substance out, the purification taking place in only one shell and tube heat exchanger comprising:

a shell, a first end region, a second end region, a first tube plate adjacent the first end region, a second tube plate adjacent the second end region, a first group of tubes extending along inside the shell from the first tube plate to the second tube plate, a second group of tubes extending along inside the shell from the second tube plate to the first tube plate, a first dome in the first end region adjacent the first tube plate, wherein the first dome is divided by a first partition into an upper first dome part and a lower first dome part, a second dome in the second end region adjacent the second tube plate, wherein the second dome is divided by a second partition into an upper second dome part and a lower second dome part, wherein the upper first dome part and the upper second dome part are connected to the first group of tubes from the first end region and the second end region, respectively, and the lower first dome part and the lower second dome part are connected to the second group of tubes from the first end region and the second end region, respectively, wherein a deflection that fluidly communicates between the interior space at the second end region and an interior of the upper second dome part;

wherein an interior space of the shell and tube heat exchanger is defined by an inner surface of the shell, an inner surface of the first tube plate, an inner surface of the second tube plate, and outer surfaces of the tubes of the first and second tubes in between the first and second tube plates, said method comprising the steps of:

allowing the foreign-substance-laden gas to flow through the interior space from the first end region to in the second end region;

allowing a cooling medium to traverse the first group of tubes from the lower second dome part in the second end region to the lower first dome part in the first end region, wherein the gas flow conducted through the interior space is cooled by way of contact with the first group of tubes;

withdrawing the gas flow, in the second end region, from the interior spacely the deflection;

introducing the withdrawn gas to the upper second dome part;

allowing the withdrawn gas to flow into and through the second group of tubes from the upper second dome part in the second end region to the upper first dome part in the first end region while undergoing an exchange of heat with the gas flow flowing into the interior space through direct contact between the gas flow flowing in the interior space and the tubes of the second group of tubes; and the foreign-substance-laden gas flowing in the interior space is cooled through counter-flow heat exchange by the combined power of the cooling medium in the first group of tubes and the gas flow in the second group of tubes.

2. The method of claim 1, wherein the cooling medium is guided substantially in a closed circuit, with said cooling medium being cooled to a predefined temperature by a primary coolant before entering the tubes of the first group at the second end region of the heat exchanger.

3. The method of claim 2, wherein the cooling of the cooling medium takes place in a cooler.

4. The method of claim 3, wherein the primary coolant is a liquefied gas.

5. The method of claim 4, wherein the primary coolant is guided in an open circuit.

6. The method of claim 2, wherein the primary coolant is injected into the substantially closed circuit by an injector to combine it with the flow of the cooling medium.

7. The method of claim 6, wherein the primary coolant is injected by an injector with such a level of kinetic energy that a flow is thereby maintained in the substantially closed circuit, in particular without the use of a pump.

8. The method of claim 1, wherein an additional quantity of the cooling medium is supplied to the second end region of the heat exchanger in order to reduce an operating temperature there.

9. The method of claim 2, wherein the cooling medium and the primary coolant are identical and the primary cooling medium is injected into a flow of the cooling medium upstream of an inlet into the second end region.

10. The method of claim 9, wherein the cooling medium which traverses the tube heat exchanger being guided in a substantially closed circuit, from which primary cooling medium, which is injected into the heat exchanger upstream of the inlet, is discharged again downstream of the heat exchanger.

11. The method of claim 6, wherein an amount of the primary coolant injected into the substantially closed circuit to combine with the flow of the cooling medium makes up between 5 and 20% of the combined amount of the cooling medium and primary coolant which traverses the heat exchanger per unit time.

12. A device for purifying a foreign-substance-laden gas flow of the foreign substance, with the gas flow being conducted through a heat exchanger and being placed in thermal contact with a cooling medium in order to freeze and/or condense the foreign substance out, characterized in that:

the heat exchanger is a shell and tube heat exchanger having a shell, a first end region, a second end region, a first tube plate adjacent the first end region, a second tube plate adjacent the second end region, at least first and second groups of tubes extending inside the shell between the first and second tube plates, a first dome in the first end region adjacent the first tube plate, wherein the first dome is divided by a first partition into an upper first dome part and a lower first dome part, a second dome in the second end region adjacent the second tube plate, wherein the second dome is divided by a second partition into an upper second dome part and a lower second dome part, wherein the upper first dome part and the upper second dome part are connected to the first group of tubes from the first end region and the second end region, respectively, and the lower first dome part and the lower second dome part are connected to the second group of tubes from the first end region and the second end region, respectively;

an interior space of the shell and tube heat exchanger is defined by an inner surface of the shell, an inner surface of the first tube plate, an inner surface of the second tube plate, and outer surfaces of the tubes of the first and second tubes in between the first and second tube plates;

a flow of the foreign-substance-laden gas is received into the interior space from a gas flow inlet at the first end region and traverses the interior space to the second end region;

a deflection that fluidly communicates between the interior space at the second end region and an interior of the upper second dome part, said deflection being adapted to withdraw the gas from the interior space at the second end region and introduce the withdrawn gas to the interior of the upper second dome part;

the first group of the tubes is part of a substantially closed cooling medium circuit, the foreign-substance-laden gas flowing in the interior space being in direct contact with the tubes of the first group so that heat is exchanged between the foreign-laden-gas and the cooling medium via the tubes of the first group, wherein a cooling medium traverses the first group of tubes from the lower second dome part in the second end region to the lower first dome part in the first end region; and the second group of the tubes receives the gas flow from the deflection at the second end region and directs the gas flow through the second group of tubes from the upper second dome part in the second end region to a purified gas outlet in the upper first dome part in the first end region.

13. The device of claim 12, wherein the second end region of the heat exchanger is adapted and configured to direct the gas flow into the second group of tubes.

14. The device of claim 12, wherein the cooling medium circuit has a delivery device and a cooler which is traversed by primary coolant and which is arranged upstream of the second end region of the heat exchanger, wherein cooling medium warmed through heat exchange with the gas flow in the interior space is cooled at the cooler through heat exchange with the primary coolant.

15. The device of claim 14, wherein the cooler is connected to an open or closed primary coolant circuit.

16. The device of claim 12, wherein the substantially closed cooling medium circuit further comprises, in its throughflow direction downstream of outlets of the first group of tubes, an additive inlet allowing an additional quantity of cooling medium to be injected into a flow of the cooling medium received from the first group of tubes, a cooler adapted and configured to cool the cooling medium through heat exchange with a primary coolant, and an additive outlet allowing for removal of a quantity of the cooling medium from the substantially closed cooling medium circuit equivalent to the additional quantity of cooling medium that is injected into the flow of the cooling medium received from the first group of tubes.

17. The device of claim 16, further comprising adjusting devices adapted and configured to control a flow of the cooling medium into the additive inlet and out of the additive outlet.

18. The device of claim 12, wherein the heat exchanger is tilted upwardly in the direction of the throughflow of cooling medium of less than 10° with respect to the horizontal.

19. The device of claim 12, further comprising two or more condensate outflows on an underside of the heat exchanger which are arranged at intervals in series in the direction of the throughflow with cooling medium.

20. The device of claim 12, further comprising at least with a first measuring sensor for measuring a measurement value from which the temperature of the gas flow in the second end region of the heat exchanger can be derived.

21. The device of claim 12, further comprising at least one actuating element being disposed in the cooling medium circuit and/or in the coolant circuit, the at least one actuating being connected to a process regulator so that the refrigerating power supplied to the heat exchanger can be regulated.

22. The method of claim 1, wherein a measurement value which is proportional to the temperature of the gas flow in the second end region of the heat exchanger is measured and adjusted in a regulated fashion to a predefined nominal value, by virtue of the throughflow and/or the temperature in the cooling medium circuit being correspondingly adapted.

23. The method of claim 22, wherein a process regulator processes the measurement value and activates a delivery device in the cooling medium circuit and/or a regulating valve in the coolant circuit as actuating elements so as to keep the measurement value constant.

24. The method of claim 23, wherein the temperature in the cooling medium circuit upstream of the heat exchanger is regulated by the regulating valve in the coolant circuit, and the temperature in the cooling medium circuit downstream of the heat exchanger is regulated by the delivery device.

25. The method of claim 22, wherein the supply of coolant into the cooling medium circuit is regulated by an injector, a temperature in the cooling medium circuit upstream of the heat exchanger is regulated by the quantity of supplied coolant, and a temperature in the cooling medium circuit downstream of the heat exchanger is regulated by a speed of the supplied coolant and/or the type of supply.

26. The method of claim 4, wherein the liquefied gas is liquid nitrogen or liquid carbon dioxide.

27. The method of claim 9, wherein the cooling medium is nitrogen or carbon dioxide.

28. The method of claim 11, wherein the injected quantity of primary cooling medium makes up between 10 and 15% of the quantity of cooling medium which traverses the heat exchanger per unit time.

29. The device of claim 15, wherein the primary coolant is liquid nitrogen or carbon dioxide.

* * * * *